United States Patent [19]
Neely, Jr.

[11] 3,817,405
[45] June 18, 1974

[54] BALE HANDLING APPARATUS

[76] Inventor: Allan B. Neely, Jr., 12991 Nevada, Aurora, Colo. 80010

[22] Filed: Feb. 26, 1973

[21] Appl. No.: 335,547

[52] U.S. Cl. ............... 214/6 B, 214/6 F, 214/8.5 A, 214/8.5 G, 214/519
[51] Int. Cl. ............................................ B65g 57/32
[58] Field of Search ............ 214/6 B, 6 F, 6 P, 16.6, 214/518, 519, 520, 521, 522, 8.5 A, 8.5 R, 8.5 G, 8.5 K, 8.5 SS

[56] References Cited
UNITED STATES PATENTS
| | | | |
|---|---|---|---|
| 1,935,409 | 11/1933 | Mudd | 214/6 F |
| 2,324,930 | 7/1943 | Joa | 214/16.6 X |
| 3,596,777 | 8/1971 | Neely, Jr. | 214/6 B |
| 3,631,992 | 1/1972 | Dickinson | 214/6 B |

*Primary Examiner*—Robert J. Spar
*Attorney, Agent, or Firm*—Van Valkenburgh, Lowe & Law

[57] ABSTRACT

The invention concerns an apparatus at one end of a vehicle for loading and unloading hay bales onto and from the vehicle. The vehicle carries a horizontally disposed bale stack having bales arranged in vertical tiers which shift along the deck of the vehicle as bales are moved into and out of the loading and unloading apparatus. For building up the stack, the apparatus will pick up bales, convey the same to a table above the stack where the bales are arranged as layers of a tier, and the apparatus will then lower the tier into position at deck level and shift the tier onto the deck as part of the stack. When the stack is completed, the vehicle is moved to an unloading station. To unload the bales in the stack, a reverse operation is effected. A tier is shifted into the loading and unloading apparatus and it is then dropped, layer by layer, onto a conveyor below the stack level for discharge of one bale at a time from the stack.

11 Claims, 10 Drawing Figures

PATENTED JUN 18 1974

BALE HANDLING APPARATUS

This invention relates to apparatus for handling hay bales, and more particularly to vehicles whereon hay bales may be loaded and unloaded. As such, the invention will be called a "Bale Handling Apparatus."

In those portions of the United States where there is high humidity and considerable rainfall, as in regions commonly called the northeast, middle east and in the eastern portion of the midwest, the farmers must protect their hay crop from the weather and the common practice is to bale the hay and store the bales in a barn or similar structure. The bales are then taken from the barn as they are needed. In such operations, a substantial labor cost is incurred in loading the hay bales onto a vehicle in the field and thereafter, unloading the bales as onto a conveyor system in the barn. A subsequent, also costly, operation is in loading the hay bales stored in the barn onto a vehicle, transporting the same to a feed lot and then unloading and distributing the bales one-by-one at selected locations about the feed lot.

While machinery has been developed for picking up bales in a field and forming bale stacks, such is not alwyas suitable where conveying and stacking apparatus is provided for in barns, which usually have receiving and dispensing conveyors for handling one bale at a time. The available bale pickup and handling equipment is for handling bale stacks in different types of operations from that above described. A bale throwing apparatus is available to speed up the loading of a vehicle in a field, but this does not avoid hand labor in unloading the vehicle at the barn.

The present invention was conceived and developed with the foregoing and other considerations in view, and this invention comprises, in essence, a vehicle, preferably a trailer, which has a deck for holding a horizontally-positioned stack of hay bales. In association therewith, there is provided a bale pick-up and dispensing mechanism to feed bales into, or dispense bales from, the stack carried by the vehicle.

It follows that an object of the present invention is to provide, in combination with a vehicle for receiving and holding a stack of hay bales, a novel and improved apparatus on the vehicle for receiving bales to add to the stack and for dispensing bales from the stack.

Another object of the invention is to provide, in combination with a vehicle which will hold a horizontally disposed stack of hay bales and which has a receiving and dispensing apparatus at one end of the vehicle, a simplified means to shift the stack of bales towards and away from the receiving and dispensing apparatus as it feeds bales into the stack and takes bales away from the stack.

Another object of the invention is to provide a novel and improved hay bale receiving and dispensing apparatus to be carried upon a vehicle, whereupon a horizontal stack of bales may be formed and wherein the receiving and dispensing apparatus will function to receive bales, one at a time, to form a tier of bales to be added to the stack, or receive a tier of bales from the stack to be dispensed one at a time from the vehicle.

Other objects of the invention are to provide in a novel and improved bale handling apparatus which performs the desired functions above indicated, an arrangement of components which is simple, economical, easy to manufacture, effective and rugged and durable.

With the foregoing and other objects in view, all as hereinafter further described, my invention comprises certain constructions, combinations and arrangements of parts as hereinafter set forth, defined in the appended claims and illustrated in the accompanying drawings, in which:

Referring more particularly to the drawing, the bale loading apparatus is carried upon a vehicle V, which is illustrated as a wheel-mounted trailer formed in a conventional manner. The vehicle frame includes a pair of longitudinal frame sills 20 which are spaced apart by cross beams 21. A transverse axle 22 is affixed to the rear of the sills 20 and two rear wheels 23 are mounted upon this axle. A transverse cross plate 24 is affixed to the front of the sills and connects with a steering axle 25 by a pin 26. Front wheels 27 are mounted upon this axle 25. A steering tongue 28 connects with the axle 25 for connection with a suitable tractor, not shown. Other suitable arrangements for the construction of this vehicle V are also possible. The vehicle may be designed for towing, as shown, or it may be mobile as when a truck is modified for the purpose at hand, in any suitable manner not shown.

The bale handling apparatus, located at the front end of this vehicle V, includes a number of components which cooperate to first pick up bales as they lay in a field or to receive bales B as they are discharged from a baler. The bales are then arranged in pairs, end-to-end, and the pairs are arranged in transversely disposed vertical tiers. The vertical tiers are then shifted into a longitudinal, horizontally-disposed stack B' upon the bed of the vehicle. Subsequently, these components will cooperate to discharge the bales from the stack, as hereafter set forth.

To carry this bale handling apparatus, a suitable box-like framework F is affixed to the frame sill members 20. This framework F is built over the forward and central portion of the apparatus and includes uprights 30, longitudinal members 31 and cross members 32 in an essentially symmetrical arrangement such as shown in the drawing. Other frame and structural restraining and holding members, not shown, such as sidewalls to hold a stack, may be used if desired.

It is also contemplated that the apparatus may be used for other purposes than for the invention herein described, such as for example, the handling of silage. Silage is handled at present by apparatus having some of the features of the present invention, and thus, the changeover involves only simple problems which need not be described herein in detail.

The several components mounted upon the vehicle and upon the frame are best described with respect to the movement of hay bales into and from the apparatus. A bale pickup conveyor C is mounted at the front, and at one side of the box-like frame F to pick up bales B from the field and move them upwardly to the top of the apparatus. There, the bales are deposited upon a shifting deck S where pairs of bales are shifted to a transverse position across the front of the deck and into a transversely disposed bale elevator E. The elevator E, upstanding from the front of the apparatus, lowers the bale pairs in a step by step sequence to form a vertical tier. When the tier is formed, it is pushed from the elevator E and onto a stack-forming platform P which extends from the front to the rear of the apparatus.

When a sufficient number of tiers are addped to the platform to complete the horizontally disposed stack B' on the platform, the vehicle will be moved to a discharge station for unloading. The movement of the bale stack B' is then reversed and the bales are moved, tier by tier, into the bale elevator E. The bales in each tier are lowered, one pair of bales at a time, onto a bale discharge conveyor D which extends transversely across the frame 20 underneath the bale elevator.

The several mechanisms which cooperate to make up the invention may be actuated one at a time by manual controls or they may be operated sequentially by integrated electrical controls. One such system is set forth to complete the description of a preferred embodiment of the invention.

The bale pickup conveyor C is a conventional unit and thus, need not be described in detail. It is formed generally as a rectangular chute 35, inclined upwardly at a steep angle with the entrance 36 at the ground and the discharge 37 at the top of the apparatus. This chute is mounted to the side of the framework at the position illustrated when the entrance 36 is to be at the ground, but this chute may be positioned otherwise when the entrance 36 is to receive hay bales from a hay baling machine. Following conventional construction, a bale gripping conveyor chain 38 at the floor of this chute extends about sprockets, not shown, on a pair of shafts 39 and 40 at the entrance and exit of the chute. This chain is driven by a suitable hydraulic motor 41 secured to the shaft 39. The drive is adapted to be stopped by mechanisms hereinafter described, so as not to move bales upon the shifting deck when other bales are being handled upon the deck or when the apparatus is unloading bales.

The shifting deck S is formed as a flat, horizontal plate 44 at the top of the frame F and suitable cross members 32 are provided to support this deck plate 44. An overhanging portion 44' of this plate, supported by framework members 45, extends beyond the side of the framework to be aligned with the pickup conveyor C. Thus, bales will continue to move rearwardly and upon this overhanging portion 44' after they are discharged from the pickup conveyor C. This rearward movement is assisted by a rearwardly extended belt conveyor 46 which is suspended between shafts 47 and 48, and is located in this section 44'. This belt conveyor 46 may be driven in any suitable manner as by connection with the shaft 40 of the pickup conveyor C with the shaft 47 of the belt conveyor 46. A belt 49 is mounted upon pulleys 50 on the shafts 40 and 47.

Figure 1:
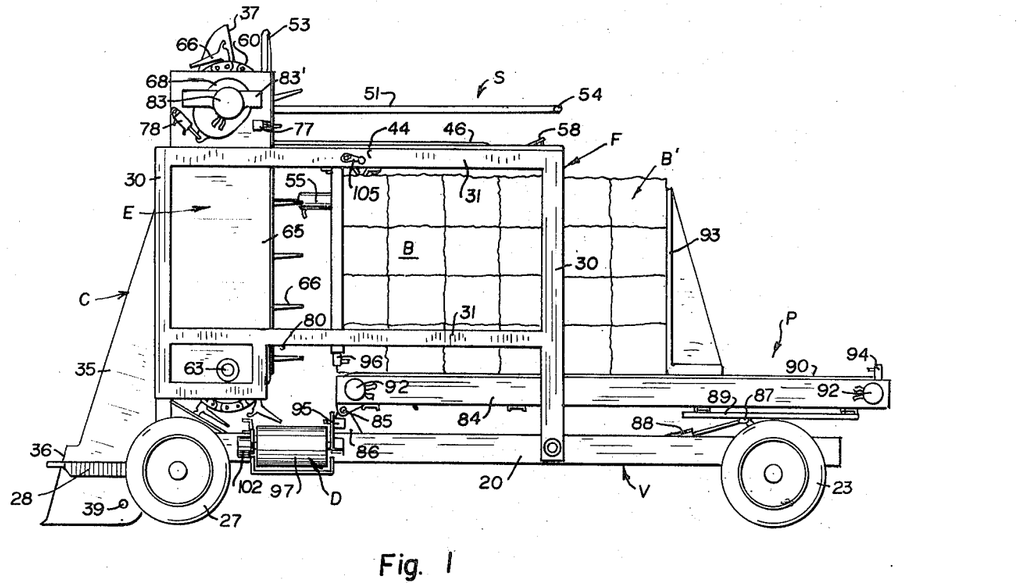
FIG. 1 is a left side elevational view of a bale loading apparatus constructed according to the principles of the invention.
Figure 2:
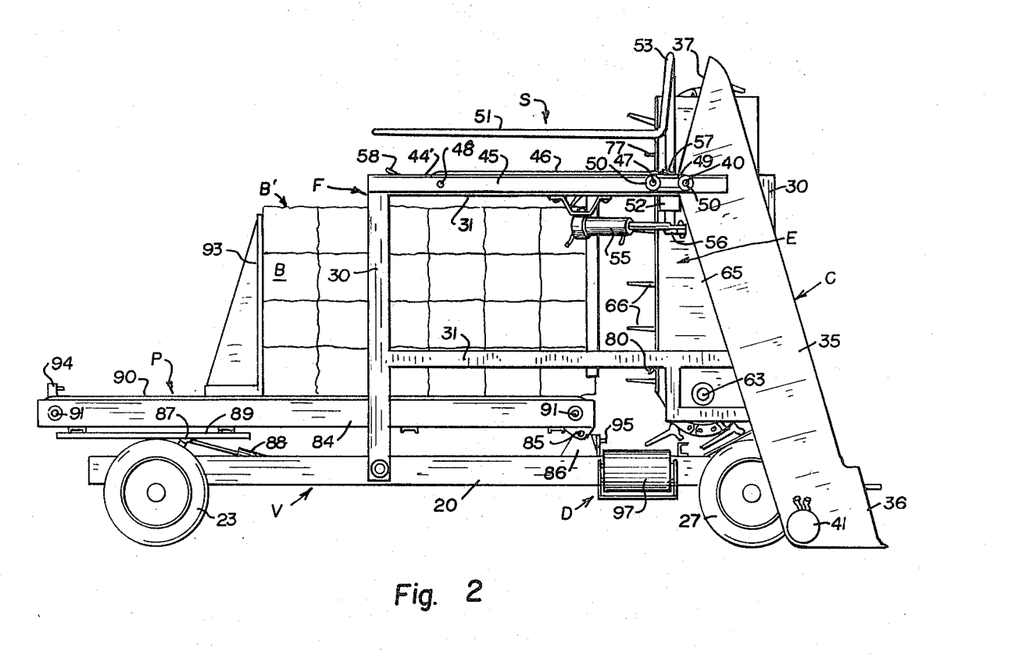
FIG. 2 is a right hand side elevation view of the apparatus shown at FIG. 1.
Figure 3:
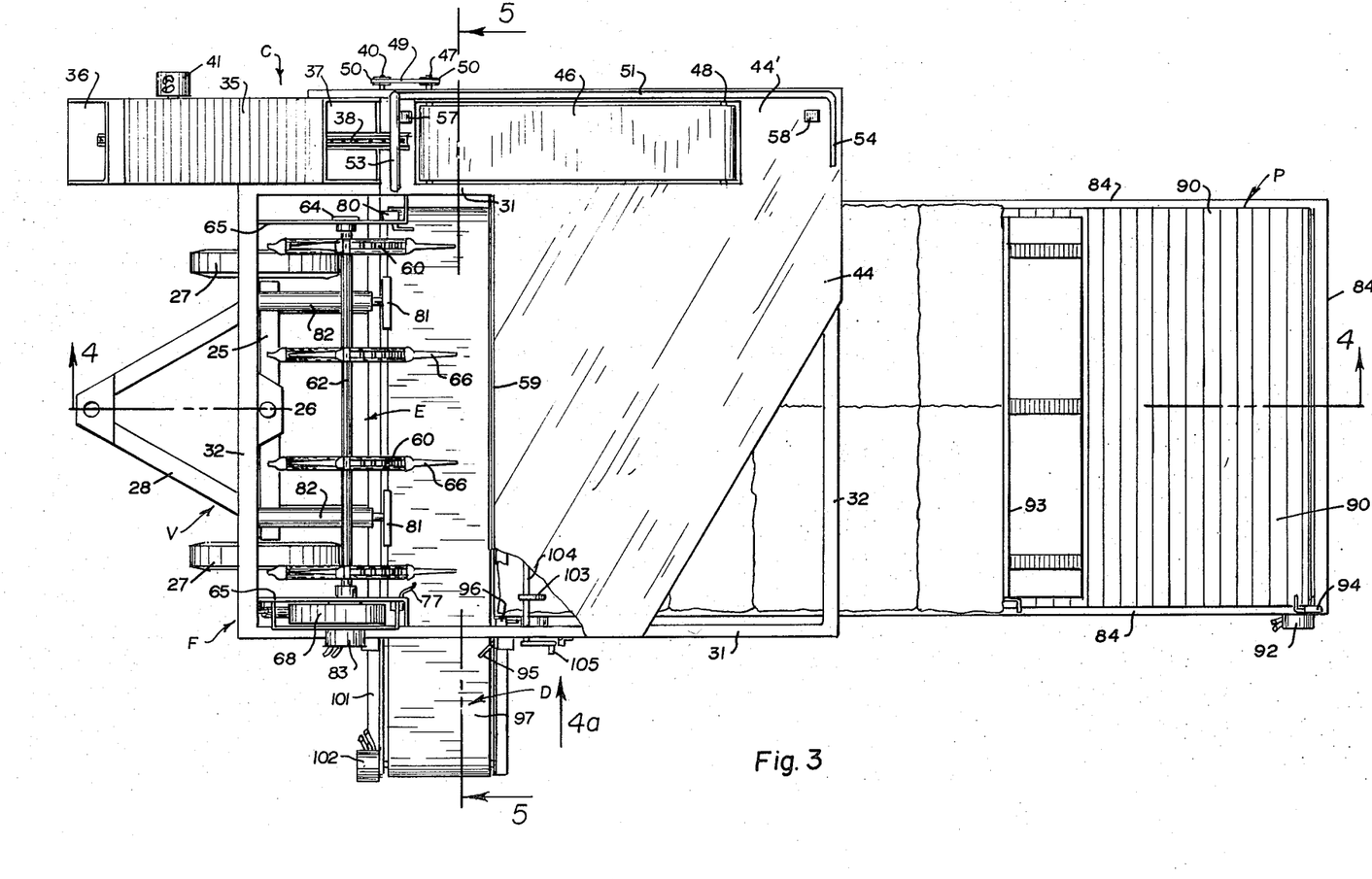
FIG. 3 is a plan view of the bale loading apparatus shown at FIG. 1, but on an enlarged scale.

The length of the rearwardly extended overhanging portion 44' is sufficient to permit two bales to be moved from the conveyor C and rearwardly, with the aid of the belt 49, to an end-to-end position before the pair of bales are shifted and rotated into the bale elevator E. This corresponds with the width of the framework F which is sufficient to accommodate a pair of bales B, disposed transversely end-to-end. Thus, each vertical tier of bales in the horizontal stack is also two bales wide, as best shown at FIG. 3.

The movement of the bales upon plate 44 is effected by a swing arm 51 which is pivoted in a frame bearing 52 adjacent to the discharge end 37 of the conveyor C. This arm operates to rotate and swing over the deck 44 to shift a pair of end-to-end bales from a longitudinal position on section 44' to a transverse position at the bale elevator E. This swing arm pivot bearing 52 is necessarily at the inner side of the deck plate overhang, but the arm must bear against the outward side of the of the bales thereon and thus, the arm 51 is formed with an upstanding archway 53 to permit the bales to move therepast. The extended end of the arm is formed as a hook 54 to stop the rearward movement of the bales as they move into their longitudinal position upon the overhanging deck 44' to hold them in place when they are swung to the elevator E. This arm 51 is rotated from and to its longitudinal position and to and from its transverse position by a double acting hydraulic cylinder 55 mounted upon the frame F underneath the deck plate 44. The piston of the cylinder 55 is connected to a lever 56 on a lower portion of the swing arm 51 which is below the bearing 52. The hydraulic cylinder is operated by switches 57 and 58 on the overhanging portion 44' of the deck and by other controls, including limit switches, which are hereinafter described. To complete the shifting deck assembly, the deck plate adjacent to the elevator E is terminated by a transverse edge 59 to provide an opening at the elevator wherethrough pairs of transversely disposed bales may drop without dragging as they move onto the elevator E.

Figures 4, 4A:
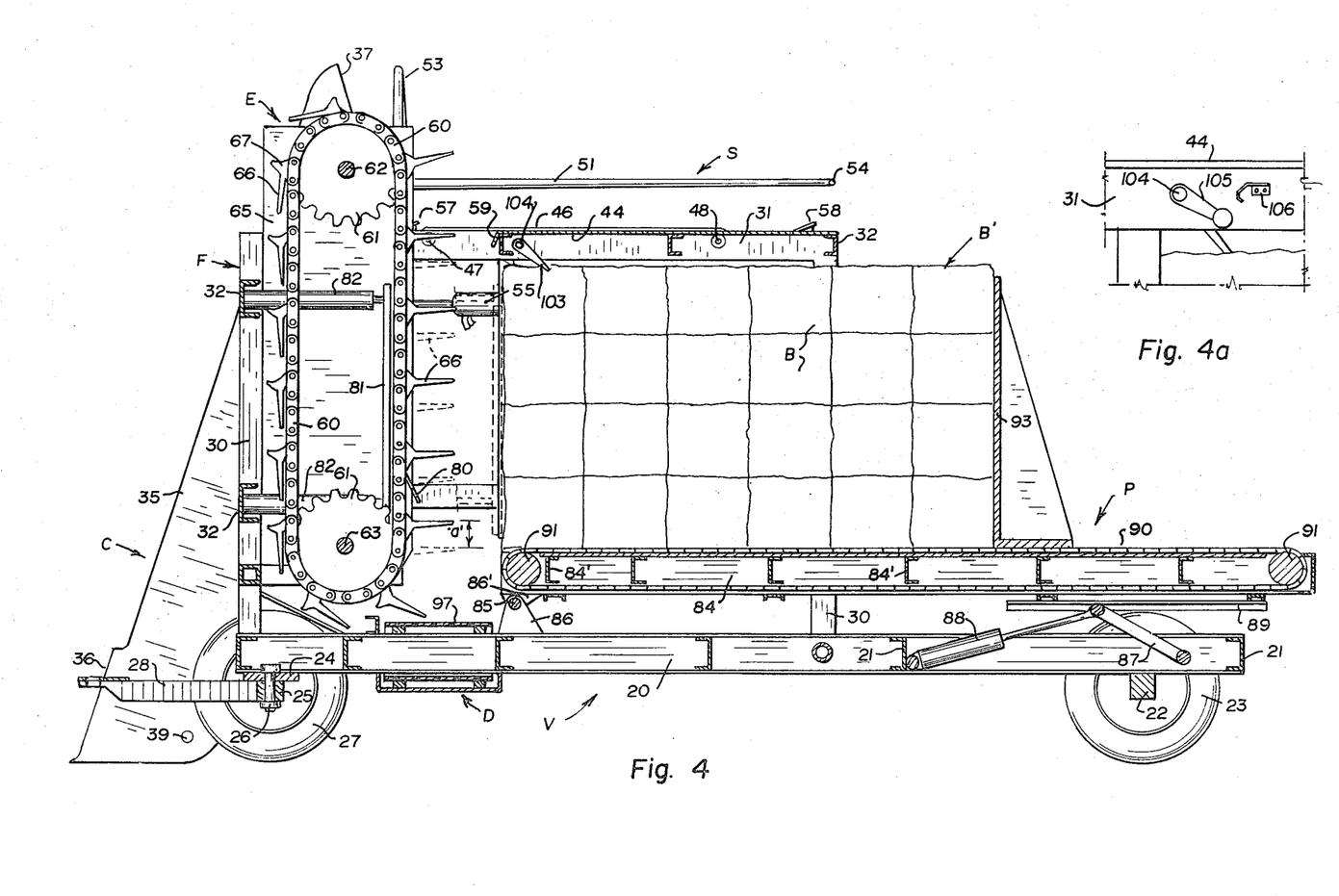
FIG. 4 is a longitudinal sectional view of the apparatus as taken from the indicated line 4—4 at FIG. 3.
FIG. 4a is a fragmentary portion of the left side of the apparatus as taken from the indicated arrow 4a at FIG. 3, but on an enlarged scale.

The bale elevator E is located at the front of the vehicle V and includes four chain loops 60 mounted upon sprockets 61 between an upper transverse shaft 62 and a lower transverse shaft 63 to provide forward and rearward vertical reaches of the chains. These shafts, in turn, are mounted in bearings 64 in upright opposing structural body plates 65, and it is to be noted that the chain sprockets 61 are secured to their shafts and thus will move in unison at all times. The chain loops are arranged in pairs and each pair is spaced to support a bale, the support being effected by sets of arms 66 on the chains which outstand from the rearward reach of the chain loops, but are otherwise folded against the chain. Each arm 66 has a reach of approximately two-thirds a bale width and includes an abutment 67 at its base. One end of this abutment 67 is connected to a chain link pin 66' and the other end is formed as a crotch 67' to abut an adjacent chain link pin. The abutments are arranged to cantilever the arms outwardly at the rearward vertical reach of the chains, where bales are to be held, but to fold against the chain at other positions to save space, as best illustrated at FIG. 4.

A set of the arms 66 of the elevator E will normally be at the level of the deck plate 44 to receive a pair of bales moved across the shifting deck S. Then, the sprockets 61 rotate and the rearward reach of the chain loops move downwardly to place the next set of arms 66 in position at the deck plate to receive another pair of bales. This step-like sequence of movements will continue until the first mentioned set of arms 66 is near, but a short distance above the stack forming platform P, and a complete bale stack tier is then held by the elevator. Next, an adjustment movement of the sprockets drops the first mentioned set of arms of the bale tier to the deck level of the stack forming platform P and the tier is ready to be shifted to the platform. This adjustment movement is indicated as *a* showing the arms 66 shifted from the solid line position to a dotted line position at FIG. 4.

The dropping of the bales in the elevator E in a step-like sequence is controlled by an indexing head 68 mounted within a closed frame 69 which, in turn, is swingably carried upon a shaft bearing 64. The head includes a gear 70 affixed to the end of the upper shaft 62, which projects into and through the frame 69. A spacer gear 71 is mounted upon a pivot pin 72 and meshes with the gear 70. The pivot pin 72, in turn, is secured to a wall member of the head frame 69. The spacer gear 71 is selected as a size which will rotate one half revolution when the sprockets 61 drop the arms 66 one bale space, and a pair of diametrically opposed stop pins 73 project from the face of this gear to hold the rotation of the gear to the specified one-half revolution. This is effected by a hook 74 which is swingably carried upon the wall of the head frame 69 to engage a stop pin 73. A solenoid 75, having its armature connected to the hook 74, pulls the hook away from pin 73 whenever it is charged, while a compression spring 76, between the hook and solenoid biases the hook 74 towards engagement with the stop pin 73. This solenoid is actuated by circuits which include a switch 77 mounted upon the body plate 65 with its contact finger of the switch being extended to engage a hay bale when the bale is pushed from the deck 44 and in position upon the arms 66 of the elevator. Thus, as soon as a pair of bales are pushed onto the arms 66, the switch 77 is actuated to release the hook 74 from a pin 73 and drop the arms 66 to position another set of arms for receiving bales. At the same time, the switch 77 reverses the cylinder 55 to move the swing arm 51 back to its initial position and performs other functions as will be hereinafter further described.

Figures 5, 6, 7:
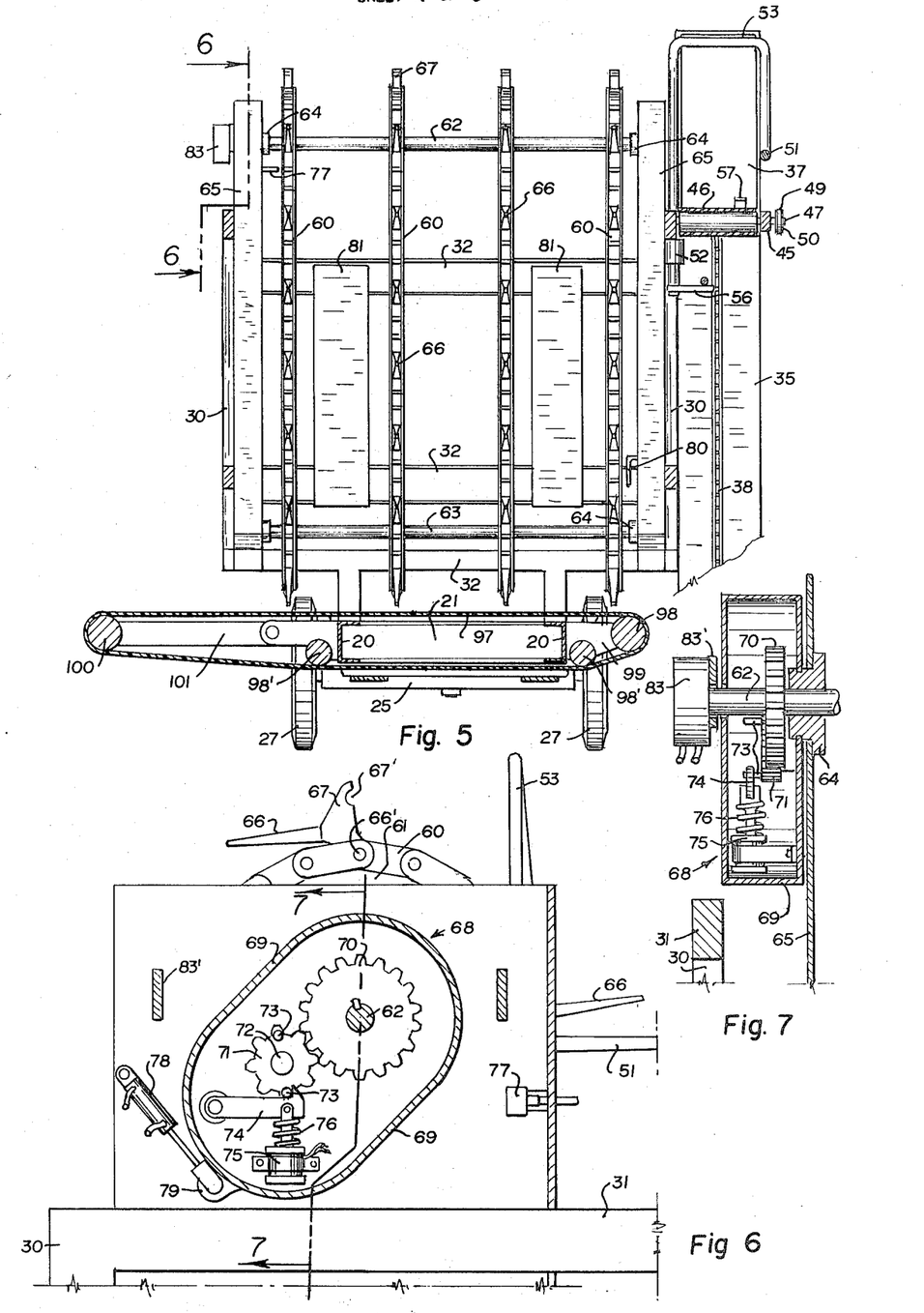
FIG. 5 is a transverse sectional elevation view as taken from the indicated line 5—5 at FIG. 3.
FIG. 6 is a fragmentary sectional detail as taken from the indicated line 6—6 at FIG. 5, but on an enlarged scale.
FIG. 7 is a fragmentary sectional detail as taken from the indicated line 7—7 at FIG. 6.

The final adjustment movement *a* is effected by rotating the head 68 about its mounting bearing 64. A double acting cylinder 78 has one end mounted upon the wall of the body plate 65 and the piston thereof is secured to a lug 79 of the head frame 69 as best illustrated at FIG. 6. When the piston is extended, as illustrated, the arm sets 66 are at the solid line positions illustrated at FIG. 4 and when the piston is retracted, the arms drop a distance *a* to the dotted line positions. This cylinder is operated by controls which are actuated by a switch 80 near the base of the elevator as hereinafter described.

The movement of the tier of bales from the elevator E and onto the stack forming platform P is effected by upright horizontal pushers 81 which are flat plates disposed between the chain loops 60 at the center of each vertical group of bales in a tier. Each horizontal pusher 81 is carried by the pistons of a pair of longitudinally extended cylinders 82 which are affixed to the front wall of the framework F, on cross members 32. These cylinders, not less than four, are connected in a hydraulic circuit to operate in unison, as hereinafter described, and function to push the bale tier onto the platform P as indicated in broken lines at FIG. 4. These cylinders 82 are operated by controls and circuits which include the switch 80, and in a sequence of movements which commence when the shifting head 68 moves to the final adjustment position as above described.

To complete the elevator construction, a hydraulic motor 83 is connected to the extension of shaft 62 beyond the head 68, and this motor is held in position by strap 83' secured to the body plate 65. This motor will normally not need to be used since the weight of the bales upon the arms 66 will always move the rear face of the chain reaches downwardly. Thus, the hydraulic motor is adjusted to normally act as a brake or damper to restrict the rate of movement of the elevator, and whenever the motor is to be positively actuated, it may be done manually by actuating a suitable hand valve in the hydraulic circuit which is at any location handy to an operator.

The stack forming platform P is formed as a framework of longitudinal side members 84 secured in position by transverse spacer members 84'. The front end of this platform is mounted upon a pivot shaft 85 by structural bearing ears 86 upstanding from the vehicle frame sills 20 and ears 86' depending from the longitudinal edge members 84. The rear end of this platform is supported upon an elevator arm assembly 87, pivotally mounted between the frame sills 20 and actuated by a cylinder 88 to push the elevator arm upwardly and at various inclinations against a slide 89 underneath the platform P, as best illustrated at FIG. 4. This cylinder is operated by a manual control valve in the hydraulic circuit at any location handy to an operator to tip the platform downward, rearwardly when loading and to raise the platform to a level position, as shown, when unloading.

A movable deck 90 is extended about rollers 91 at each end of the platform and hydraulic motors 92 are affixed to the shafts of the rollers. However, whenever bale tiers are pushed upon the deck 90 of platform P, these motors may function as idlers, since the force of the cylinders 82 is sufficient to move bale tiers onto the platform and to shift the movable deck 90 rearwardly. To hold the rearward bale tiers upright, a wall 93 is attached to the movable deck 90 as shown. A suitable limit switch 94 is mounted at the rear end of the vehicle to stop loading operations whenever the stack on the vehicle is completed, the circuits therefor being hereinafter described.

The unloading of the bale stack on the vehicle may progress in various ways. For example, the platform P may be modified to tip upwardly and to the rear in a manner similar to that of a dump truck. Such an arrangement is not shown herein, but the necessary modifications and structural changes can be made by a skilled mechanic without departing from the invention herein described. Another unloading expedient involves removing the restraining wall 93 and operating the hydraulic deck motors 92 to move the deck rearwardly and discharge the entire stack as a single operation.

The preferred mode of unloading the hay bales in the stack on the platform P involves reversing the movement of the shiftable deck and moving one tier of hay bales at a time into the elevator E, and then dropping the bales, one pair at a time, onto the discharge conveyor D. The hydraulic motors 92 operating the shiftable deck 90 will be used for this purpose. The switches and circuits for unloading the bales in this manner will be hereinafter described.

As a bale tier moves from the stack and into the elevator E, the bales may move upon the sets of arms 66 if they are adjusted at the elevation of the bottom of the bales, that is, at the position shown in broken lines at FIG. 4. However, if the arms 66 are at a higher position, as shown in solid lines at FIG. 4, the bales will be impaled upon the arms 66. Either mode of carrying the bales upon the arms is satisfactory, and as the bales are moved forwardly and into position upon the elevator, the switch 80 is tripped to activate circuits which control the movement of the hydraulic motors 92 to move the deck 90 rearwardly a short distance and release the bale tier held by the arms 66. At the same time, solenoid 75 is actuated to permit the elevator to lower and drop the lower pair of bales in the tier upon the discharge conveyor D.

The discharge conveyor D, hereinafter described, moves the lower pair of bales from the apparatus and as these bales are discharged, a switch 95 is normally closed whenever a bale is upon the conveyor and as soon as both bales are discharged, this switch effects actuation of the solenoid 75 to drop the next lower pair of bales of the tier onto the discharge conveyor. This operation is repeated until the last layer of bales is dropped onto the discharge conveyor, whereupon switch 80 is released to permit the motors 92 to move another tier from the stack into the bale elevator to repeat the entire sequence.

When the last bale tier is moved into the elevator and the bales in the tier are moved from the apparatus, the switch 80 will actuate the motors 92 of deck 90. but the wall 93 then moves against a limit switch 96 to stop the entire operation until the loading cycle is commenced.

As best shown at FIG. 5, the discharge conveyor D is a simple conveyor belt 97 transversely extended about the frame members 20 below the elevator. This belt is carried upon idle rollers 98 and 98' at one side of the vehicle, which are mounted upon lugs 99 affixed to the frame 20. A drive roller 100 is mounted upon extendable arms 101 at the other side of the vehicle and a hydraulic motor 102 is carried on one of these arms as illustrated. The switch 95 is mounted alongside this conveyor to engage any bale upon this conveyor as mentioned. A suitable means may be provided for holding the bale tiers in position upon the platform 90 when they are pushed from the elevator and onto the deck. An array of sloping fingers 103 is mounted upon a transverse shaft 104 at the underside of the shifting deck S as shown at FIGS. 3 and 4. These fingers slope rearwardly and downwardly to engage the top bales of the bale tier adjacent to the elevator and prevent forward movement thereof. A handle 105 connects shaft 104 to rotate the shaft and lift the fingers whenever the bale tiers are to move forwardly and into the elevator. A catch 106 is provided on the longitudinal member 31 to hold this handle in a lifted position.

The electrical and hydraulic circuits to operate this apparatus may be arranged for manual operation of all components. However, it is preferred to have a system which will afford reliable, automatic sequencing of all operations of loading and unloading the vehicle. In such a system, the switching circuits will use switches heretofore mentioned and also use other components such as relays and limit switches which are not shown in the mechanical drawings, but are indicated in the circuit diagrams of FIGS. 8 and 9.

Figure 8:
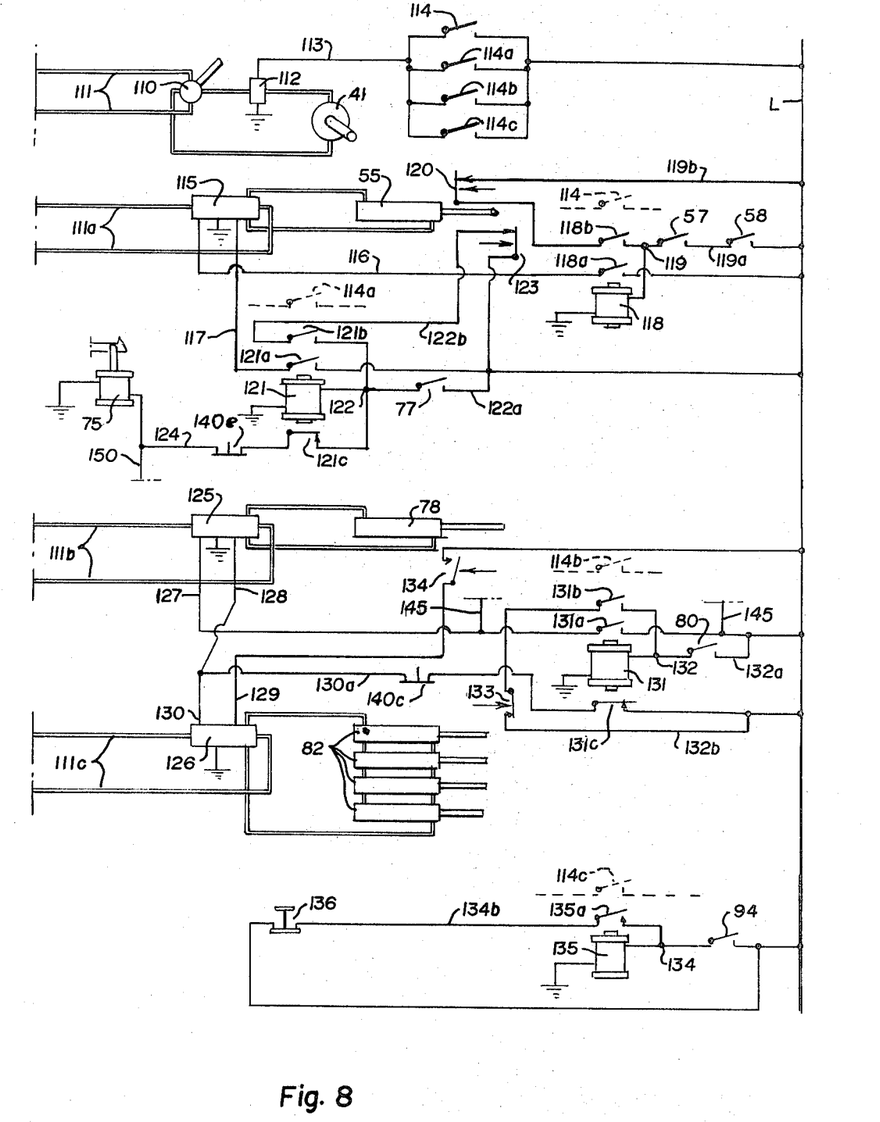
FIG. 8 is an electrical circuit diagram of circuits which function in loading the apparatus.

The circuit diagram of FIG. 8 shows the various hydraulic and electrical controls for loading. The conveyor motor 41 is operated by a manual valve 110 in the hydraulic pressure and return lines 111 which extend to the motor from a conventional hydraulic power supply source. In addition, there is a normally open electrical shut-off valve 112 in one of the hydraulic lines. A circuit lead 113 from a conventional electrical power lead L extends to this shut-off valve 112, but the valve is normally inactivated by open switches 114, 114a, 114b and 114c in parallel in the lead 113. The valve 112 may be energized by closing any one of these four switches and it will then close to stop the motor 41 to prevent bales from moving onto the platform 44. The switches 114 and 114a are closed when the swing arm 51 is moving bales to the elevator and returning therefrom. Switch 114b is closed whenever a tier of bales is being pushed into the stack. The switch 114c is closed when the vehicle is fully loaded. With the arrangement shown, it is to be noted that the pressure and return lines 111 are in parallel with other lines of the system to permit the valve 112 to function as described.

FIG. 8 also shows the hydraulic and electrical controls for the cylinder 55 which operates the swing arm 51 to move bales to the elevator E. The cylinder 55 is operated by an electrically actuated four-way control valve 115 in hydraulic pressure and return lines 111a from the hydraulic power source and in parallel with lines 111. Circuit leads 116 and 117 at the valve 115 extend to the electrical lead L. When the circuit 116 is energized, the piston of cylinder 55 is retracted to swing the arm 51 to the elevator E. This circuit lead 116 includes a normally open relay switch 118a of relay 118. An interlock circuit 119 includes the relay 118 and has a normally open relay switch 118b. The trigger lead 119a of the interlock circuit 119 includes the normally open switches 57 and 58 in series. These switches are closed only when two bales are moved upon the deck section 44'. The locking lead 119b of the interlock circuit includes a switch 118b and a normally closed limit switch 120 which opens to break the interlock when the piston of cylinder 55 is fully retracted. Normally open switch 114 of the motor circuit completes the group of switches at the relay 118 and that switch 114 closes to stop the conveyor motor 41 whenever the relay 118 is energized. This prevents bales from moving onto the deck 44 when the arm 51 is swinging.

The return movement of the swing arm 51 commences by a bale striking the switch 77 as it moves into the elevator E. The circuit lead 117 includes a normally open relay switch 121a of relay 121. An interlock circuit 122 includes the relay 121 and a normally open relay switch 121b. The trigger lead 122a of the interlock includes the normally open switch 77 which closes when the bales move into the elevator. The locking lead 122b of interlock includes the switch 121b and a normally closed limit switch 123 which opens to break the interlock when the piston of the cylinder is fully extended and the arm 51 is swung back to its initial position for receiving bales. Switch 114a of the motor circuit is also actuated by the relay 121 and that switch is closed to also stop the conveyor motor 41 while the arm 51 is swinging to its return position.

The downward movement of the bale elevator is also controlled by the relay 121. This movement is initiated whenever a pair of bales are received on the arms 66 and switch 77 is closed. A lead 24, connecting with the trigger lead 122a at the relay 121, extends to the solenoid 75. This lead 124 includes a normally closed relay switch 121c which will open as soon as the relay 127 is energized by closing the switch 77. Thus, only a pulse of energy will act on the solenoid 75 to pull the hook 74 for an interval sufficient to release only one stop pin 73 and drop the bales on the arms 66 only one step.

As soon as the tier of bales being formed in the elevator moves downwardly to contact the bottom switch 80, the movement of bales onto the deck is again stopped and the bale tier is shifted to the level of the deck by action of cylinder 78 and then pushed onto the deck by action of the cylinders 82. The cylinder 78 is operated by an electrically actuated four-way valve 125 in hydraulic pressure and return lines 111b and the cylinders 82 are operated by an electrically actuated four-way valve 126 in hydraulic pressure and return lines 111c. Circuit leads 127 and 128 in control valve 125 extend to the electrical power lead L and circuit leads 129 and 130 in the control valve 126 extend to the electrical power lead L, through a series of switches now described. Leads 128 and 130, the leads which effect the retraction cycle of the valve operations, connect into a common lead 130a to power and these leads normally remain energized.

The lead 127 of valve 125 includes a normally open relay switch 131a of relay 131. An interlock circuit 132 includes the relay 131 and a normally open relay switch 131b. The trigger lead 132a of the interlock includes the bale contact switch 80 which closes when contacted by a bale tier. The locking lead 132b of the interlock includes the siwtch 131b and a normally closed limit switch 133 which does not open until the pistons of the cylinders 82 are fully extended. The relay also includes normally open switch 114b which closes to stop movement of bales onto the deck when the adjusting ahd shifting operations are under way.

It is thus contemplated that the piston of cylinder 78 will retract and remain retracted when the switch 131 is closed. A normally open limit switch 134 in the circuit lead 129 is closed when the piston of cylinder 78 is retracted and thus, after the piston of cylinder 78 is retracted, the pistons of pusher cylinders 82 are extended to push the bales from the elevator. When the pistons of cylinder 82 are extended, the switch 133 opens releasing the interlock. The normally energized leads 128 and 130, connecting through power through lead 130a, as mentioned, are de-energized by opening a normally closed relay switch 131c which opens when the interlock relay 131 is energized. This switch 131c is thus held open until the cylinders 82 are fully extended to open limit switch 133. Then the switch 114b opens, the piston of cylinder 78 extends and the pistons of cylinders 82 are retracted to return the system to its initial stage for receiving bales onto the plate 44 for forming another bale tier.

When the movement of the bale tiers onto the deck 90 fills the platform and the vehicle is loaded, all loading operations must cease. The wall 93 moves rearwardly on the platform and activates limit switch 94. This switch is in the trigger lead 134a of an interlock circuit 143 which includes relay 135. The locking lead 134b includes normally open relay switch 135a and a normally closed manual release switch 136. The relay also operates to close switch 114c of circuit 113. The reuslt is that the locking of the circuit 134b and the closing of switch 114c will stop all further loading movements of the apparatus, but leave the elevator components free to unload the stack and loading operations cannot again commence until the operator manually opens release switch 136.

Figure 9:
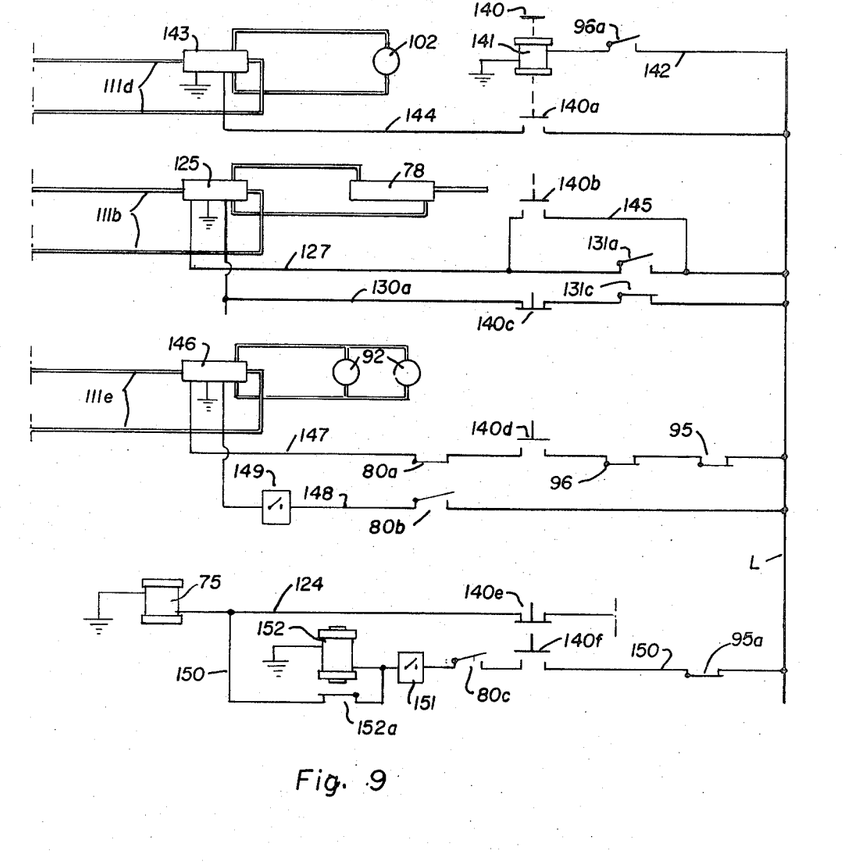
FIG. 9 is an electrical circuit diagram of circuits which function in unloading the apparatus.

The circuit diagram of FIG. 9 shows the various hydraulic and electrical controls for unloading a bale stack from the platform of the vehicle. The unloading sequence is initiated by a gang switch 140 having normally open and normally closed legs as will be described and having a retracting solenoid 141 which is energized by closing normally open switches 96a in a lead 142 as will be hereinafter described.

The belt 97 of the discharge conveyor is started and runs continuously during unloading. The hydraulic conveyor motor 102 is operated by an electrically actuated valve 143 in the hydraulic leads 111d. A circuit lead 144 connects this valve with the power lead L and a normally open switch leg 140a is in this lead. Thus, the closing of switch 140a starts the motor 102.

The cylinder 78 is retracted to lower the support arms 66 to receive a bale tier when the arms are at the dotted line positions shown at FIG. 4. The circuit lead 127 heretofore described, includes a shunt lead 145 which bypasses the normally open relay switch 131a used for loading. A normally open switch leg 140b closes this shunting lead to effect retraction of the piston 78. To supplement the switch leg 140b, a normally closed switch leg 140c is interposed in the lead 130a to open and prevent a voltage in lead 130a from opposing the voltage in lead 127.

The bale stack on the platform is moved forwardly by the hydraulic motors 92. An electrically actuated valve 146 controls the forward and reverse movement of these motors and is in hydraulic pressure and return lines 1113. The valve 146 is of a type which will permit the motors to idle when the motors are shut off. A circuit lead 147, aving a normally open switch leg 140d, in it, extends from the power line L to the valve 146 to initiate forward rotation of the motors to move the forward tier of the stack into the bale elevator. This lead also includes the limit switch 95 which is normally closed, but which opens whenever any bales are upon the discharge conveyor belt 97. The lead 147 also includes the limit switch 96 which is normally closed but which opens whenever the stack wall 93 moves forwardly after the last bale tier in a stack has been pushed into the bale elevator. Accordingly, whenever limit switches 95 or 96 open, the bale stack on the platform cannot move towards the elevator. The lead 147 also includes a normally closed switch 80a which actuates in unison with switch 80 heretofore described, and which opens when a bale tier is pushed into the elevator to stop the forward movement of the stack. The electrical valve 146 also includes a lead 148 which actuates the valve to direct the motors 92 rearwardly and away from the bale elevator. This lead 148 includes a normally open limit switch 80b which closes when switch 80a opens to initiate the retracting movement of the bale stack as soon as a bale tier is pushed into the elevator. This lead also includes a timer switch 149 which is normally open, which closes whenever switch 80b closes the circuit and which will remain closed for a short time interval, say five seconds, to move the bale stack rearwardly on the vehicle and away from the tier pushed onto the bale elevator to permit this bale tier on the bale elevator to subsequently drop downwardly without interference by the bale stack.

Once a tier of bales is in the elevator, the elevator functions to drop one layer of bales at a time upon the belt to permit these bales to be discharged from the apparatus before another layer of bales is dropped. This dropping action is controlled by the solenoid 75 in the index head 68. A normally closed switch 140e is located in the lead 124 of the loading circuit and this switch 140e opens to separate the solenoid from the loading circuits. A lead 150 extends from the solenoid 75 to the power lead L and this lead includes a normally open switch 140f. The lead 150 also includes a normally oepn switch 80c which closes in unison with the actuation of switches 80a and 80b and a time delay switch 151 which is normally open and which is timed to close a few seconds after the switch 80c closes. It also includes a normally closed switch 95a which is open whenever bales are upon the belt, to thus prevent the elevator from dropping more than one layer of bales at a time. One branch of this lead 150 extends to a relay 152. The other branch of the lead includes a normally closed switch 152a and this second branch of the lead 150 extends thence, to the solenoid 75. The indexing head thus operates to lower the bales of a bale tier one step a few seconds after the switch 80c is closed by movement of a bale tier into the elevator because of the action of delay switch 151, this delay giving the motors 92 a chance to reverse the movement of the stack to release the bale tier in the elevator from the stack. As a bale layer moves off the belt, switch 95a opens to again energize the lead 150 and drop another bale layer onto the belt. When the entire bale tier is discharged, switch 80c opens and the stack will again move to shift the next bale tier into the elevator to repeat the operation.

The final step of this operation comes about when all bale tiers are moved into the elevator and discharged from the conveyor. When the last bale is discharged from the conveyor, switch 95 again closes to energize the circuit 147. However, the empty support wall 93 then moves toward the elevator, but contacts limit switch 96 to open that switch and stop the forward movement of the motors 92. At the same time, the switch 96a of circuit lead 142 is closed to energize the solenoid 141 to retract the switch 140 to place all sections of this gang switch in an initial inoperative state. When the circuit to solenoid 141 is closed by the delayed closing of switch 151, the switch 152a opens but only after a pulse is directed to solenoid 75.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim:

1. Apparatus to load hay bales upon the deck of a vehicle to form a longitudinally-extended, horizontally-disposed stack, which consists of a longitudinal array of transversely-disposed, vertical bale tiers, with each tier consisting of a vertical array of transversely disposed bale layers, the loading apparatus in combination with the vehicle and a framework means being located at one end of the vehicle and comprising:
    a. an upright bale elevator having a continuous sequence of transverse, horizontally-disposed, vertically-shiftable bale-layer holding sections including a group of sections which extend verticlly a distance exceeding the height of a bale tier of the stack by at least one extra holding section, and with the vertical group being so located with respect to the vehicle deck that bale layers on the other holding sections form a tier at the vehicle deck level and the one extra holding section is positioned at a loading station for receiving a hay bale layer;
    b. a bale shifting means adapted to receive bales, form a bale layer and to shift the bale layer to the elevator holding section at the loading station;
    c. a stepper means moving the holding sections vertically, one at a time, past the loading station to permit a bale layer to be shifted onto each holding section and thereby form a bale tier on the elevator when the proper number of sections have been moved past the loading station and thence to the deck level; and
    d. a pusher means associated with the elevator to push a completed bale tier from the elevator and onto the deck when a completed bale tier has been moved to position at the deck level.

2. In the apparatus defined in claim 1, wherein the bale elevator includes:
    a plurality of chains extended between sprockets mounted upon an upper shaft and a lower shaft with the aforesaid holding sections being located at a reach of the chains between the upper and lower sprockets.

3. In the apparatus defined in claim 2, wherein:
    the holding sections are formed by arms outstanding from the chains.

4. In the apparatus defined in claim 3, wherein:
    said arms are pivotally connected to the chains, each arm having an abutment stop cooperating with the chain, whereby the arm will outstand from the chain when the arm is at the aforesaid reach between the upper and lower sprockets, but to swing against the chain when the arm is at other positions about the path defined by the chains.

5. In the apparatus defined in claim 1, wherein:
    the said loading station is above the bale-tier-forming holding sections and the bale shifting means includes a shifting deck at the level of the loading station above the bale tier sections;
    a conveyor means to pick up bales and to move them onto the shifting deck; and
    a sweep arm adapted to move bales on the deck into the loading station of the elevator.

6. The apparatus defined in claim 5, wherein:
    each bale layer comprises two bales in an end-to-end relationship;

said conveyor means moves bales onto the shifting deck in a longitudinal position with respect to the bales, whereby a pair of bales will be moved from the conveyor to the deck in an end-to-end alignment;

said sweeping arm is adapted to normally lie adjacent to the path of bales from the conveyor and to receive and hold two bales in tandem; and means to swing the sweep arm and pair of bales into the loading station of the elevator.

7. The apparatus defined in claim 6, wherein:

said sweep arm is positioned to receive the bales as they move from the conveyor means to the deck; and a trigger means to actuate the sweep arm to swing the same and the bales held by it into the elevator whenever a pair of bales is embraced by the sweep arm.

8. In the apparatus defined in claim 2, wherein:

the stepper means includes an escapement means adapted to limit the movement of the chains to shift the holding sections downwardly a single holding section space; and a means to trip the escapement whenever the holding section at the loading station is loaded with bales.

9. In the apparatus defined in claim 8, wherein the stepper means includes:

a solenoid associated with the escapement means; and a switch at the elevator which is tripped to momentarily energize the solenoid when the bales are loaded onto the elevator at the loading station.

10. In the apparatus defined in claim 4, including:

a discharge space beneath the lowermost holding section at the deck level adapted to permit bales moving below the deck level to drop from the elevator and into the said discharge space; and a lateral conveyor means adapted to move the bales dropped therefrom away from the apparatus.

11. In the apparatus defined in claim 10, including:

means associated with the vehicle deck to push a tier of bales into the elevator; and escapement means to permit the lowermost layer of bales in the tier to be dropped into the discharge section.

* * * * *